June 2, 1931.    G. E. SPOFFORD    1,807,712
BASS BOMB
Filed Aug. 19, 1930

Inventor
Gordan E. Spofford,

By *Clarence A. O'Brien*
Attorney

Patented June 2, 1931

1,807,712

UNITED STATES PATENT OFFICE

GORDON E. SPOFFORD, OF BUZZARDS BAY, MASSACHUSETTS

BASS BOMB

Application filed August 19, 1930. Serial No. 476,279.

This invention relates to certain new and useful improvements in what is known in the art as a "bass bomb", or device used by fishermen when fishing for "bass".

A primary object of this invention is to provide a device of the above mentioned character, which will insure the low placing of the bait or "chum" at the bottom of the pond as a lure to the bass, thus providing for a more effective lure for the bass, than is obtained when the bait or "chum" is located on the top of the water where the small fish would prove troublesome to the fisherman's line.

A still further object of the invention is to provide a device of this character which is comparatively simple in construction, inexpensive, practical, efficient and otherwise well adapted for the purpose designed.

Other objects and advantages of the invention will become apparent during a study of the following description, taken in connection with the accompanying drawings wherein.

Figure 1:
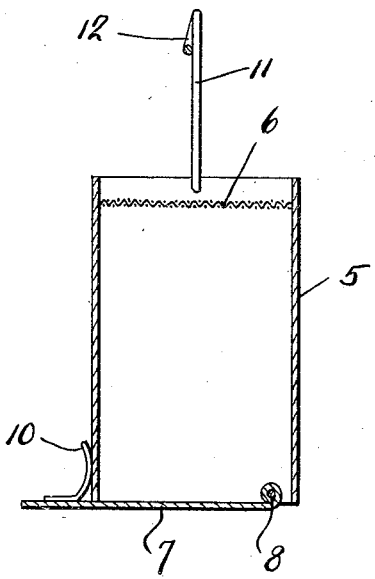
Figure 1 is a longitudinal transverse sectional view through the bomb.
Figure 2:
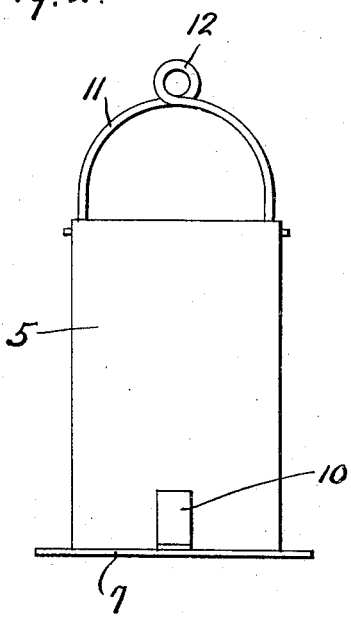
Figure 2 is a front elevational view thereof.
Figure 3:
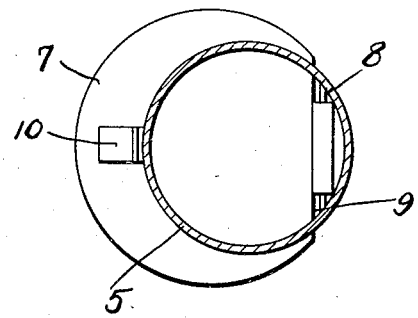
Figure 3 is a horizontal transverse sectional view therethrough.

With reference more in detail to the drawings, it will be seen that my improved bass "bomb" comprises an open ended cylindrical body 5. Arranged in the body 5 adjacent the upper end thereof is a wire netting or screen 6 that provides a perforated closure for said end of the body.

For controlling the lower end of the body 5 there is provided a flap valve which consists of a closure plate 7 hinged at one end to the lower end of the body 5 as at 8. At said hinged end the plate 7 has a relatively squared or straight edge 9 whereby to provide a spacing between the hinged end of the plate and a corresponding portion of the wall of the body 5. The plate 7 is of a diameter greater than the diameter of the body 5 and projects laterally of the body at the side and forward end of the body. On its projecting forward end portion, the plate 7 is provided with a spring catch or retainer 10 that is adapted to frictionally engage the peripheral wall of the body 5 for yieldably retaining the closure plate 7 in a normally closed condition.

For the bomb, there is provided a suitable bail 11 that has the end of the leg thereof engaging the upper edge of the body 5 at diametrically opposite sides of the body to provide a hinge connection between the bail and the body. Intermediate its ends, the bail 11 is provided with an integral eye 12 whereby to facilitate attaching of the bomb to the end of the fish line.

In use, the lure or bait is placed in the body 5 and the valve plate 7 is closed. When attached to the end of the fisherman's line, the weight of the bomb will cause the bomb to sink to the bottom of the pond carrying its contents therewith. When at the bottom of the pond, the fisherman may exert a pull on the line resulting in the valve plate 7 swinging to an open position. When the bomb so opens water rushes in through the top of the body 5 through the screen 6 will force the bait or "chum" out of the body at the bottom of the pond where most likely the large bass are to be found.

Even though I have herein shown and described the preferred embodiment of my invention, it is to be understood that the same is susceptible to changes fully comprehended by the spirit of the invention as herein described, and the scope of the invention.

Having thus described my invention, what I claim as new is:

1. A device for the purpose specified, comprising a body adapted to contain live bait, a perforated closure for one end of the body, a normally closed valve for the opposite end of the body, and means to facilitate securing the device to a fish line.

2. A bass bomb comprising an open end body, screening extending across the body adjacent one end thereof, a hinged closure plate for the other end of the body, yieldable means normally retaining said plate closed, and a bait carried by said body.

In testimony whereof I affix my signature.

GORDON E. SPOFFORD.